(12) United States Patent
Koepf et al.

(10) Patent No.: US 12,311,784 B2
(45) Date of Patent: May 27, 2025

(54) CIRCUIT BREAKER

(71) Applicant: Ellenberger & Poensgen GmbH, Altdorf (DE)

(72) Inventors: Hendrik-Christian Koepf, Nuremberg (DE); Lothar Hofmeister, Neumarkt (DE); Manuel Engewald, Nuremberg (DE); Markus Miklis, Pfeifferhuette/ Schwarzenbruck (DE); Ricardo Pimenta, Eckental (DE); Michael Watzlawick, Nuremberg (DE); Fabian Hiereth, Lauterhofen (DE)

(73) Assignee: Ellenberger & Poensgen GmbH, Altdorf (DE)

( * ) Notice: Subject to any disclaimer, the term of this patent is extended or adjusted under 35 U.S.C. 154(b) by 195 days.

(21) Appl. No.: 18/081,974

(22) Filed: Dec. 15, 2022

(65) Prior Publication Data

US 2023/0191912 A1    Jun. 22, 2023

(30) Foreign Application Priority Data

Dec. 17, 2021    (DE) ..................... 10 2021 214 614.7

(51) Int. Cl.
*H01H 3/32*    (2006.01)
*B60L 3/00*    (2019.01)
*H01H 71/10*    (2006.01)

(52) U.S. Cl.
CPC ............. *B60L 3/0069* (2013.01); *H01H 3/32* (2013.01); *H01H 71/10* (2013.01)

(58) Field of Classification Search
CPC ........... H02H 3/06; H02H 3/087; H02H 3/05; H02H 9/02; H01H 33/66; H01H 3/20; H01H 71/10; H01H 71/12; H01H 3/32; H01H 2009/543; H01H 9/541; H01H 2051/2218
USPC ....................................... 361/2–13
See application file for complete search history.

(56) References Cited

U.S. PATENT DOCUMENTS

| | | |
|---|---|---|
| 2,905,792 A | 9/1959 | Caswell |
| 5,247,419 A | 9/1993 | Grundmann |
| 5,886,860 A | 3/1999 | Chen et al. |
| 10,790,107 B2 | 9/2020 | Koepf et al. |
| 11,328,889 B2 | 5/2022 | Koepf et al. |
| 2010/0006544 A1* | 1/2010 | Onufriyenko ........ H01H 73/045 218/154 |

(Continued)

FOREIGN PATENT DOCUMENTS

| | | |
|---|---|---|
| DE | 3133221 A1 | 3/1983 |
| DE | 19851226 A1 | 5/2000 |

(Continued)

*Primary Examiner* — Danny Nguyen
(74) *Attorney, Agent, or Firm* — Muncy, Geissler, Olds & Lowe, P.C.

(57) ABSTRACT

A circuit breaker having a mechanical switch introduced into a main current path, which comprises a fixed contact and a moving contact connected to a movably mounted contact bridge. The circuit breaker comprises a drive, which is in active connection with the contact bridge, and which comprises a first drive unit and a second drive unit. The first drive unit is energized via a control circuit, and the second drive unit is connected in parallel to a resistor element introduced into the main current path. The invention also relates to a motor vehicle.

9 Claims, 6 Drawing Sheets

(56) References Cited

U.S. PATENT DOCUMENTS

| | | | | |
|---|---|---|---|---|
| 2016/0190791 A1* | 6/2016 | Sim | ................... | H02H 3/087 |
| | | | | 361/93.6 |
| 2016/0322809 A1* | 11/2016 | Wang | ................... | H02H 9/02 |
| 2020/0321180 A1* | 10/2020 | Zhou | ................... | H01H 9/542 |
| 2021/0276532 A1* | 9/2021 | Shin | ................... | H01M 10/425 |

FOREIGN PATENT DOCUMENTS

| | | |
|---|---|---|
| DE | 10244961 B3 | 2/2004 |
| DE | 202016102682 U1 | 7/2016 |
| EP | 0483591 A2 | 5/1992 |
| WO | WO9910902 A2 | 3/1999 |
| WO | WO2009138603 A1 | 11/2009 |

\* cited by examiner

CIRCUIT BREAKER

This nonprovisional application claims priority under 35 U.S.C. § 119(a) to German Patent Application No. 10 2021 214 614.7, which was filed in Germany on Dec. 17, 2021, and which is herein incorporated by reference.

BACKGROUND OF THE INVENTION

Field of the Invention

The present invention relates to a circuit breaker having a mechanical switch introduced in a main current path. Furthermore, the invention relates to a motor vehicle with a circuit breaker.

Description of the Background Art

Increasingly, motor vehicles, such as commercial autos, i.e., buses or trucks, have one or more electric motors as their main drive, which is used directly for locomotion. For the operation of the electric motor or motors, a high-voltage battery is usually provided, via which a DC voltage at a level between 400 V and 800 V is provided. The electrical currents between the high-voltage battery and the electric motor amount to several 10 A during operation.

In the event of a fault, such as a short circuit or an accident, it is necessary to electrically disconnect the high-voltage battery from other components of the motor vehicle, such as the electric motor. For this purpose, a circuit breaker is usually used, which has a switch which is introduced in a main current path between the high-voltage battery and the electric motor. The circuit breaker is designed in such a way that when a certain limit value is exceeded by the electric current conducted via the main current path, the switch is actuated so that the electrical current flow is prevented.

As a switch, for example, a semiconductor switch is provided. In this case, however, comparatively high electrical losses occur during operation, which reduces the efficiency and thus also the range of the vehicle. Alternatively, a (mechanical) relay is provided as a switch, which has a fixed contact and a moving contact movably mounted thereto. The moving contact is usually connected to a contact bridge, which is driven by an electric coil acting as an electromagnet. As a result, inertia is increased, so that the switch has a comparatively slow switching time. To avoid this, it is possible to use an electric coil with a comparatively high number of turns, which, however, leads to increased manufacturing costs. Thereby, the force acting on the contact bridge is also comparatively high; hence the mechanical load is increased.

SUMMARY OF THE INVENTION

It is therefore an object of the present invention to provide a particularly suitable circuit breaker and a particularly suitable motor vehicle, wherein advantageously safety is increased and/or manufacturing costs as well as the load and losses occurring during operation are reduced.

The circuit breaker is used, for example, for fuse protection, i.e., to protect an electrical line and/or a component, such as a device. In other words, the circuit breaker is thus a miniature circuit breaker or a device circuit breaker.

The circuit breaker has a main current path in which a mechanical switch is introduced. Via the main current path, an electric current is conducted during operation, and/or an electrical voltage is applied to this, wherein in the event of a fault, i.e., if the fuse is required, the electrical current flow through the main current path is to be interrupted in particular. Preferably, the main current path is formed at least partially via a busbar which is made, for example, of a metal, preferably a copper, such as pure copper or a copper alloy, for example brass. Conveniently, the circuit breaker has at least two connections via which the main current path is connected to other components in the assembly state. For example, the connections are identical or different from each other and, for example, in each case a screw or plug connection.

The mechanical switch, which is hereinafter referred to in particular simply as a switch, has a fixed contact and a moving contact, which is connected to a contact bridge movably mounted with respect to the fixed contact. Consequently, the moving contact is also movably mounted to the fixed contact, namely via the contact bridge. For example, the moving contact is welded to the contact bridge and, for example, single-piece with this. Alternatively, the moving contact is made of a material different from the contact bridge. For example, the fixed contact is fixed and its position is thus rigid. Alternatively, the position of the fixed contact is variable, and this is movably mounted, for example, via another bridge or other mechanical conditions.

The circuit breaker can comprise a housing which is made, for example, of a plastic, and within which both the fixed contact and the moving contact are arranged. Here, the contact bridge is conveniently supported via a hinge or other bearing on the housing, for example a plain bearing. In a further development, a guide is formed via the housing itself, via which the contact bridge is supported. The fixed contact is particularly preferably rigidly arranged on the housing or at least immovable with respect to the housing, hence the design is simplified. For example, the contact bridge is mechanically connected directly to a rigid (possible) busbar of the main current path and thus in particular to one of any possible connections. For movable supporting, the contact bridge is conveniently pivotable.

The contact bridge can be formed via a stamped bent part, or another metal strip and transversely displaceable. Conveniently, a further moving contact is connected to the contact bridge. The further moving contact is advantageously assigned a further fixed contact, and when moving the contact bridge, a mechanical contact between the moving contact and the fixed contact and between the further moving contact and the further fixed contact is suitably created or canceled, in particular depending on the direction of movement of the contact bridge.

In summary, if the mechanical contact between the moving contact and the fixed contact exists, the mechanical switch is closed and electrically conductive. If the moving contact is separated from the fixed contact via the contact bridge, the switch is open and electrically non-conductive. Thus, depending on the position (state) of the contact bridge, the switch is either in the open or closed state or, for example, a position in between. In this, the distance between the moving contact and the fixed contact is not maximum, but there is no mechanical contact between them. For example, the switch comprises a locking or other latching via which the contact bridge is locked in the open or closed state. In other words, the switch is thus designed to be monostable or bistable. If the locking takes place only in one of the states, this is, for example, the closed or open state. Due to the locking/latching, it is necessary to apply a force to move the contact bridge, i.e., to operate the switch, so that unintentional actuation of the (mechanical) switch, for example due to a vibration of the circuit breaker, is ruled out.

The circuit breaker further comprises a drive which is in active connection with the contact bridge. By actuating the drive, it is possible to move the contact bridge from at least one of the two positions to the other, i.e., the closed or open position. In other words, it is possible to switch the switch by actuating the drive.

The drive comprises a first drive unit and a second drive unit, which are operated or operable separately from each other, or which are at least active depending on different circumstances, so that the contact bridge is moved. In this case, the first drive unit is energized via a control circuit. In other words, the control circuit is provided for supplying the first drive unit, via which the first drive unit is thus fed. Particularly preferably, the control circuit is galvanically isolated from the main circuit, so that in the event of a fault in the main current path, a feedback effect on the control circuit is prevented. Thus, the energizing of the first drive unit can take place essentially undisturbed. The control circuit is supplied, for example, via the main current path, in particular via a transformer. In a further development, the control circuit is fed via a separate energy source, and the circuit breaker has in particular further connections for this purpose, which are introduced, for example, in the possible housing of the circuit breaker. Conveniently, the control circuit has a voltage level that differs from the voltage level, or at least the electrical potential, which is guided with the main current path. In particular, the control circuit is operated with a lower electrical voltage. Thus, the design of the circuit breaker is simplified.

The second drive unit can be (electrically) connected parallel to a resistor element introduced into the main current path. Thus, it is possible to energize the second drive unit via the electrical current conducted via the main current path. This occurs in particular if the electrical voltage dropping through the resistor element is greater than the electrical voltage dropping through the second drive unit. Conveniently, the resistor element is selected/built/designed such that normally the electric voltage dropping through the resistor element is lower than the electric voltage dropping through the second drive unit, preferably much lower. Thus, the electric current conducted via the main current path is essentially conducted only via the resistor element.

In the event of a fault, however, the electrical voltage dropping through the second drive unit is preferably lower than the electrical voltage dropping through the resistor element, so that the second drive unit is energized. Thus, in the event of a fault, for example in the event of an overload or an overcurrent, the position of the contact bridge is influenced via the second drive unit.

Due to the two drive units, it is thus possible to operate the circuit breaker independently of the fault, so that the area of application is increased. Conveniently, the force provided via the first drive unit is comparatively low, so that when it is in operation, the switching time is comparatively slow, but the mechanical load is reduced. Therefore, it is possible to use a comparatively low-performance first drive unit, hence manufacturing costs are reduced. If the fault occurs, it is possible to initiate a movement of the contact bridge and thus open the mechanical switch via the first drive unit. However, the second drive unit also has a supportive effect. Conveniently, the second drive unit is designed such that in the event of a fault, a comparatively large force is exerted, which is in particular greater than the force provided by the first drive unit. As a result, the circuit breaker has a comparatively short switching time, hence safety is increased. The provision of the increased force is possible in particular due to the comparatively large electric current conducted via the main current path. In this case, in normal operation, substantially no electric current is preferably conducted via the second drive unit, and the electric current is in this case conveniently conducted only or at least predominantly via the resistor element. Thus, occurring (electrical) losses during (normal) operation are comparatively low. Also, due to the two drive units in the event of a malfunction of one of these, it is still possible to open the mechanical switch, hence safety is increased. In other words, a redundancy is formed, wherein, for example, a safe separation is still possible even if the control circuit fails.

In summary, the two drive units make it possible to exert a comparatively large force on the mechanical switch, so that it is accelerated comparatively strongly. As a result, the switching time of the mechanical switch is accelerated, suitably in the event of a fault. However, it is also possible to operate the mechanical switch with only one of the drive units, such as in particular the first drive unit or the second drive unit, so that the electrical and mechanical load and the energy requirement is reduced. As a result, the application range of the circuit breaker is increased, and this is used, for example, during normal operation to interrupt the electric current, wherein only one of the drive units is energized. In the event of a fault, however, both drive units are used to operate the switch. Thus, a number of required components is reduced. Due to the mechanical switch, the electrical resistance of the circuit breaker is comparatively low, so that no or only comparatively low electrical losses occur when operating the circuit breaker. Galvanic isolation is also possible via the circuit breaker; hence safety is increased. Via the resistor element, it is ensured that the second drive unit is not continuously energized, hence electrical losses are also reduced.

The circuit breaker may be designed for DC interruption and, for example, to be only unidirectional or particularly preferably bidirectional. Suitably, the circuit breaker has a further main current path, wherein an electrical voltage is applied between the main current path and the further main current path during operation. For example, the further main current path is electrically connected to ground, or the circuit breaker has another mechanical switch which is introduced into the further main current path, and which is actuated via a corresponding drive. Thus, security is further increased. Particularly preferred is a maximum electrical voltage switchable via the circuit breaker that is greater than 100 V, 200 V or 500 V. For example, the maximum electrical voltage switchable via the circuit breaker is less than 3500 V or 3000 V. The circuit breaker is suitable, in particular provided and equipped for this purpose. For example, the circuit breaker is provided for switching an electrical voltage of 1000 V, and/or for switching an electric current of several 100 A, for example 200 A, 400 A, 600 A or 800 A. The circuit breaker is conveniently suitable in each case, preferably equipped for this purpose.

The circuit breaker can be used in a motor vehicle, in particular in an on-board electrical system via which an electric direct current is conducted. Particularly preferably, the circuit breaker is a component of a high-voltage electrical system of the motor vehicle and serves in particular to protect a high-voltage battery and/or an electric motor of a motor vehicle, via which in particular propulsion is provided. The motor vehicle is, for example, a ship, boat or aircraft. Particularly preferred, however, the motor vehicle is land-bound and, for example, rail-guided. The motor vehicle in this case is, for example, a railcar, a locomotive, a train or a tram. Alternatively, the motor vehicle can be moved independently of rails or the like. Conveniently, the motor vehicle is a passenger car or particularly preferably a commercial vehicle, such as a bus or a truck. Alternatively, the circuit breaker is intended for the industrial sector and, for example, in its assembly state a component of an industrial plant.

Suitably, the circuit breaker comprises a manual switch which is in active connection with the mechanical switch, preferably with the contact bridge. Via the manual switch, it is suitably possible to bring the mechanical switch into a certain state, for example into the closed state or the open state. For example, it may not be possible to transfer to the other state due to a mechanism arranged between the mechanical switch and the manual switch. Particularly preferably, however, it is possible to convert the mechanical switch into both the closed and the open state via the manual switch. In summary, the circuit breaker is thus also manually operable, and it is thus possible in particular to reset the circuit breaker. Alternatively, or in combination, it is possible, for example, via the circuit breaker, to prevent operation manually, for example of any motor vehicle.

Suitably, the circuit breaker comprises a further mechanism which acts on the mechanical switch, and via which the mechanical switch can be reset. In particular, the drive or a further drive is provided for this purpose. Thus, after tripping the circuit breaker, a reset is also possible, so that it is again current bearing. Conveniently, no manual activity is required for this.

For example, the contact bridge can be applied with a force, such as a spring force, and this is held in a certain position, for example, via a latching. Here, the drive acts in particular on the latching, such that when the drive is energized, the latching is released. As a result, the contact bridge is moved due to the further acting force. As a result, it is not necessary to exert a comparatively large force via the drive, while still operating the mechanical switch comparatively quickly.

Further, the drive can be mechanically coupled to the contact bridge. In other words, during operation, the contact bridge is moved due to the force exerted via the drive. As a result, the number of required components is reduced. In a further development, the contact bridge is latched, and the drive acts on both the latching and the contact bridge. Conveniently, a further component is present via which a force is also exerted on the contact bridge, such as the spring. In this way, the actuation of the mechanical switch, i.e., the displacement of the contact bridge, takes place both via the drive and via the other component, such as the spring, so that the switching speed is further increased. The force to be applied via the drive is reduced, so that the latter can be designed comparatively small. However, the force applied via the drive is also used to move the contact bridge, so that the force provided is used comparatively efficiently. In an alternative or further development, one of the drive units acts on the possible latching, and the other drive unit acts on the contact bridge and is thus coupled to it.

For example, the contact bridge is rigidly attached to a transversely mounted rod driven by the drive. Preferably, however, the contact bridge on the rod is also mounted transversely, wherein advantageously two end stops for limiting the movement of the contact bridge with respect to the rod are present. Thus, it is possible to move the contact bridge between these two end stops, so that, for example, in the event of a possible burn-up of the contacts or high manufacturing tolerances, there is still safe, full-surface mechanical contact of the moving contact at the fixed contact in the closed state of the circuit breaker. In particular, one of the end stops is designed in such a way that the contact bridge can still be moved out of the closed state via the drive. In other words, the distance between the end stops is preferably less than the travel of the drive. Due to the remaining end stop, it is also possible to move the contact bridge regardless of the current state of the drive, so that with a comparatively high flowing electric current due to the so-called constriction force, the contact bridge is also lifted off, so that the moving contact is separated from the fixed contact. This is done, for example, even before the contact bridge is moved via the drive. In other words, in this case, both the force applied via the drive and the forces present due to the existing magnetic fields act on the contact bridge, so that the switching speed is increased. Preferably, a spring is arranged between one of the end stops and the contact bridge, via which the contact bridge is moved to a certain position if no further forces act.

For example, the second drive unit can be directly connected to the main current path. Particularly preferably, however, the second drive side is connected via a rectifier to the main current path. In this way, it is possible to operate the circuit breaker bidirectionally, wherein the design of the second drive unit is simplified. Preferably, the rectifier is passively designed and has in particular a plurality of diodes. Conveniently, the rectifier is designed as a bridge rectifier, in particular as a B4 rectifier. In this way, on the one hand, production costs are comparatively low. On the other hand, no control or the like is required for the operation of the rectifier, hence robustness is increased.

The rectifier can also serve to adjust when the second drive unit is current bearing. Conveniently, this is only current bearing if the electrical voltage dropping through the resistor element is greater than the electrical voltage dropping from the rectifier and the second drive unit via the series connection. Thus, the requirements for the resistor element are lowered, and it is possible to use a resistor element with comparatively high manufacturing tolerances, wherein it is ensured via the electrical voltage required for the operation of the rectifier that only in the event of a fault the commutation of the electric current from the resistor element to the second drive unit takes place. Thus, operational reliability is further increased, wherein production costs are reduced.

As an alternative or particularly preferably in combination hereto, a Zener diode may be connected between the second drive unit and the main current path. If the rectifier is present, the Zener diode is conveniently located between the rectifier and the second drive unit. Due to the Zener diode, the current is only conducted via the second drive unit when the electrical voltage dropping through the resistor element reaches at least the breakdown voltage of the Zener diode, possibly in conjunction with the electrical voltage required by the rectifier. Thus, it is possible via the Zener diodes to adjust the threshold of the electric current conducted via the main current path that actuates the second drive unit. As a result, it is only necessary to adapt the Zener diode to the current use case, whereas identical parts can be used elsewhere. Thus, production costs are reduced.

Alternatively, or in combination to the Zener diode, a thermistor may be electrically connected between the second drive unit and the main current path, wherein the thermistor is thermally connected, for example, to the resistor element or other component of the main current path. If, therefore, the thermistor (NTC) heats up due to a comparatively large electrical current conducted via the main current path, its electrical resistance decreases, so that the second drive unit is current carrying and consequently the mechanical switch is opened.

A second switch may be connected between the second drive unit and the main current path. The second switch is controlled in particular via a second control unit, wherein the second control unit is energized in particular on the basis of the electrical voltage dropping through the resistor element. Alternatively, the second control unit is energized, for example, via the control circuit or always via the main current path. The second switch is closed in particular if there is a fault, which is detected, for example, via the second control unit. For this purpose, certain sensors are evaluated in particular. For example, the second switch is closed when the first drive unit is energized, so that in this case the second drive unit is also energized. Otherwise, for example, the second switch always remains open.

A second current sensor may be present, which is inserted, for example, between the second drive unit and the main current path. In other words, the second current sensor is used to measure the electric current conducted via the second drive unit. The second current sensor is, for example, a shunt or comprises this. Suitably, the second switch is actuated as a function of the electric current measured via the second current sensor.

Suitably, the second switch can be opened when the electrical current detected by the second current sensor exceeds a further limit. Thus, by operating the second switch, it is ensured that damage to the second drive unit is avoided, even in the event of a comparatively extensive fault. In this case, the second drive unit is stopped. However, it is still possible to energize the first drive unit, so that the mechanical switch is opened via this. Consequently, the electrical current flow is nevertheless interrupted via the circuit breaker. Particularly preferably, the second control unit is energized via the electric current flowing between the main current path and the second drive unit. Thus, the second control unit is only energized when the second drive unit is also energized. Thus, the amount of energy required for the operation of the circuit breaker is reduced. Nevertheless, it is possible to secure the second drive unit via the second control unit.

The circuit breaker can comprise a control unit via which the first drive unit is energized. Thus, the control unit is also fed via the control circuit and consequently energized via it. In this case, the control unit is designed in particular such that the fault is detected via this, and that in the event of a fault, the first drive unit is energized or at least actuated in such a way that the switch is opened, i.e., the moving contact is distanced from the fixed contact. The control unit is particularly suitable as well as provided and equipped for this purpose. Alternatively, or in combination thereto, the control unit is signally connected to other components in the assembly state and conveniently has a corresponding connection for this. For example, the control unit has a connection to any possible bus system of any possible motor vehicle. Suitably, the circuit breaker is used to provide functional safety, and the control unit is designed accordingly. In particular, it is possible to realize various safety functions via the circuit breaker, and the control unit is, for example, certified accordingly or at least the different control types for the first drive unit for providing functional safety are stored in it. In a further development, the current for the current supply of the first drive unit is controlled and/or regulated via the control unit, wherein, for example, a pulse width modulation is used. In this way, it is possible to set a switching time of the first drive unit.

For example, the circuit breaker also can comprise the second control unit, via which in particular the second drive unit is controlled or at least monitored. The second control unit is powered, for example, via the control circuit or via the main current path. Alternatively, the second drive unit is controlled or monitored via the control unit. Particularly preferably, however, the second drive unit is not controlled/regulated, hence robustness is increased.

The control unit has, for example, a trigger, which is designed in particular in the manner of a switch. The trigger may be arranged, for example, in close proximity or in mechanical contact with the main current path or is, for example, a component of the main current path. In particular, via the trigger, the electric current conducted via the main current path, and/or the applied electrical voltage is detected, and as a function of this, the drive, in particular the first drive unit, is energized. The trigger is, for example, magnetically designed and, for example, a reed relay or at least includes this. Alternatively, the trigger is hydraulically designed or particularly preferably a thermal release, such as a bimetal disc, another bimetallic element, a PTC thermistor (PTC) or a thermistor (NTC).

For example, the control unit can be formed via the trigger, and the trigger is conveniently electrically connected in series with the first drive unit. Alternatively, the respective trigger is designed only in the manner of a signal transmitter and signally connected to other components of the control unit. The control unit itself is realized, for example, via analog components, or it has, for example, a microcontroller.

The control unit may be signally connected to a current sensor of the main current path. The current sensor is suitable, in particular provided and configured to measure the electric current conducted via the main current path. The control unit is realized in particular via a microcontroller, or at least comprises this, or comprises several discrete, analog components. For example, the current sensor comprises an electrical coil or, for example, a shunt that is inserted into the main current path.

As a function of the value for the electric current detected via the current sensor, the first drive unit can be conveniently energized via the control unit, so that the contact bridge and consequently the mechanical switch are actuated. Due to such an embodiment, in particular, flexibility is increased, and it is particularly possible to use the circuit breaker in different areas of application. As a result, switching the mechanical switch is also possible in the event of a fault in which the switching state of the switch is not influenced via the second drive unit. As a result, the application range of the circuit breaker is increased.

The circuit breaker alternatively or in combination can comprise at least one or more electrical voltage sensors, via which, for example, the electrical voltage dropping through the mechanical switch, the electrical voltage dropping through the possible current sensor, the electrical voltage dropping through the resistor element, the electrical voltage dropping through the series connection of mechanical switch and resistor element, optionally in conjunction with a possible current sensor, the electrical voltage dropping through the first and/or drive unit and/or the electrical voltage applied between the main current path and any further main current path can be measured. Preferably, via the control unit, the first or second drive unit is energized as a function of the respective recorded values. Suitably, an evaluation of the temporal change of the electric current or the electrical voltage and the actuation of the drive, in particular the first drive unit, is carried out via the control unit as a function of said first drive unit. Consequently, it is also possible to record a wide variety of faults, hence safety is increased.

The control unit can comprise an energy storage for powering the first drive unit. In particular, during operation, the energy storage is charged via the control circuit. Thus, even in the event of a failure of the current supply via the control circuit, actuation of the drive, in particular the first drive unit, is possible, hence safety is always guaranteed. Particularly preferably, the energy storage is designed as a capacitor, which is connected, for example, electrically parallel to the first drive unit or other components of the control unit, such as a possible microcontroller. Via the capacitor, any voltage fluctuations in the control circuit are thus compensated, hence the first drive unit or the other components of the control unit are protected and safe operation is possible. In other words, the capacitor dampens short-term current jumps.

For example, the control unit comprises a charge pump, a voltage multiplier or other component via which it is possible to charge the energy storage to a higher electrical voltage than is provided via the control circuit. In this way, a comparatively large amount of electrical energy is stored via the energy storage during operation, so that in the event of failure of the control circuit, other components of the control unit can also be energized, or for the operation of the drive, in particular the first drive unit, an increased amount of electrical energy is provided, so that the mechanical switch is safely actuated.

For example, the two drive units operate according to the same principle or different principles (modes of action/operating principles). Thus, at least one of the drive units comprises, for example, an eddy current drive, an eddy current coil, a reluctance drive, a reluctance coil, a piezo actuator, or the respective drive unit is formed via a combination thereof. The two drive units can be identical or at least constructed according to the same operating principles, which simplifies the design. It is also possible to use at least partially identical parts. Alternatively, the design and/or modes of action of the two drive units differ, so that robustness and safety are increased. Particularly preferably, the drive comprises a "moving magnet actuator", which is hereinafter referred to in particular only as an actuator, and via which the two drive units are formed.

The "moving magnet actuator" can have a permanent magnet that is movably mounted. For example, the permanent magnet is rotatably mounted or particularly preferably linearly movable. The permanent magnet is connected to the contact bridge or at least in active connection with it, so that when the permanent magnet moves, the contact bridge is preferably moved. In addition, each drive unit has one or more electric coils, which are energized when the respective drive unit is actuated, so that a magnetic interaction takes place between them and the permanent magnet. The electrical coils are kept stationary.

Since the electrical coil(s) is/are stationary, the design is simplified and, with the exception of the components required for bearing, no other moving parts or electrical connections between the moving parts, namely the permanent magnet, and the stationary components of the "moving magnet actuator" are required. Thus, friction is also reduced. Since the number of moving components of the "moving magnet actuator", in particular only the permanent magnet, is comparatively low, and these in particular have a comparatively low weight, the dynamics of the actuator are comparatively high. Thus, inertia when actuating the contact bridge and thus when operating the switch is reduced. As a result, comparatively fast switching is possible via the circuit breaker, hence safety is increased.

For example, the actuator is designed to be rotational or particularly preferably linear. In this case, each drive unit has two electrical coils arranged concentrically on a (common) axis, which are spaced along the axis to each other, and between which the permanent magnet is arranged, the two poles of which are opposite each other with respect to the axis, and which is movably mounted along the axis. The two electric coils of each drive unit are energized in particular in the respective operation at the same time, and are, for example, electrically connected in series or particularly preferably electrically connected parallel to each other. The interconnection of the electric coils is such that, when they are energized, a magnetic field is created via the electric coils, which interacts with the magnetic field of the permanent magnet in such a way that it is pulled along the axis to one of the electric coils of the respective drive unit and pushed away from the other electric coil of the same drive unit. Consequently, a comparatively large force acts on the permanent magnet, hence the dynamics are further increased.

In particular, each of the electric coils of one of the drive units can be surrounded by one of the electric coils of the other drive unit, and these are in particular each arranged concentrically to each other. Thus, a comparatively compact "moving magnet actuator" is provided. Particularly preferably, the electric coils of the second drive unit have a comparatively low number of turns, which is conveniently less than 50, 30 or 20. Thus, it is also possible to use a comparatively large cross-section for the electrical conductor of the electrical coils of the second drive unit, so that the current-carrying capacity is increased. As a result, even with a comparatively large overcurrent, which is led via the main current path and thus also via the electrical coils of the second drive unit, damage to the latter is excluded. Particularly preferably, one of the electric coils of the second drive unit surrounds one of the electric coils of the first drive unit.

The "moving magnet actuator" can comprises a (magnetic) short-circuit sheet or the like, via which the permanent magnet is held in a certain position if no current is supplied to the electric coil(s). For example, in this case, the permanent magnet is attached to the short-circuit sheet or is particularly preferably always distanced from it. The short-circuit sheet is conveniently made of a ferromagnetic material, such as iron, hence manufacturing costs are reduced. Due to the short-circuit sheet, the permanent magnet is stabilized in one position, especially when the switch is closed. Consequently, the mechanical switch is designed to be at least monostable or bistable.

In another alternative, only one of the drive units is formed via the actuator. The other drive unit is, for example, formed separately from this and in particular designed as an eddy current drive or reluctance drive.

The resistor element can be designed to be controllable so that the (ohmic) resistance realized via the resistor element can be adjusted. Particularly preferably, the resistor element comprises an additional switch and is formed, for example, by means thereof. The additional switch is, for example, a mechanical switch such as a relay, or particularly preferably a semiconductor switch. In this case, two such additional switches are conveniently available, which are connected, for example, antiparallel or serial to each other, so that the circuit breaker is bidirectional. The respective semiconductor switch is, for example, a field-effect transistor, such as a MOSFET, or a bipolar transistor, such as an IGBT, IGCT, a thyristor or a GTO.

The additional switch or the interconnection from the two additional switches is conveniently controlled via an additional control unit. Via the additional control unit, in particular, the fault is detected and, as a function thereof, the additional switch or the additional switches are actuated. As a result, the electrical resistance provided by the resistor element increases abruptly, hence the electric current commutates from the resistor element to the second drive unit, so that the mechanical switch is opened. The additional control unit is energized in particular via the control circuit, so that it is operated independently of the malfunction in the main current path. Alternatively, the additional control unit is energized, for example, on the basis of the electrical voltage generated by the additional switch or the interconnection of the additional switches, which is done in particular only in the event of a fault.

Conveniently, a surge protector is connected in parallel to the resistor element and thus also to the additional switch or the additional switches, which comprises, for example, a varistor and/or a circuit of Zener diodes. For example, the surge protector is realized via so-called "active clamping" of the additional switches designed as semiconductor switches. Via the surge protector, the additional switch/switches are protected in each case, so that destruction thereof due to a comparatively high applied electrical voltage, in particular due to the actuation of the mechanical switch, is avoided. Also, in this way, via the surge protector, the electrical voltage applied to the second drive unit and to the possible rectifier is limited, hence damage to them is avoided. Due to the use of the additional switch as a resistor element, a controlled adjustment of the commutation of the electrical current from the resistor element to the second drive train is possible, so that operation of the second drive unit is possible even in the event of a large number of different events of malfunction.

The circuit breaker can comprise a second additional switch, which is connected in particular parallel to the additional switch. Suitably, the additional switch and the second additional switch are designed as semiconductor switches, and there are preferably two additional switches and two second additional switches, each connected to each other antiparallel or antiserially, so that bidirectional operation of the circuit breaker is possible. Preferably, the additional switch or switches have a comparatively low internal resistance, so that in normal operation, the electrical current carried by the main current path is conducted via these. For example, the additional switches have a comparatively poor switching behavior, hence comparatively inexpensive semiconductor switches can be used for this purpose.

The second additional switches can have, for example, a comparatively good switching behavior and are particularly suitable for switching comparatively high electrical voltages and/or high electric currents. For example, the second additional switches have a comparatively high internal resistance, so that comparatively inexpensive semiconductor switches can also be used for this purpose. Thus, both the additional switches and the second additional switches are comparatively inexpensive, but they differ from each other.

Due to the comparatively high internal resistance of the second additional switches, the electrical current is not carried via them during normal operation. Rather, the electric current is carried via the additional switches, hence electrical losses are comparatively low. In the event of a fault, the additional switches with the comparatively low internal resistance are conveniently first opened, which is preferably done via the additional control unit, which is suitable for this purpose, in particular provided and equipped. As a result, the electric current first commutates to the second additional switches, increasing the electrical losses. Subsequently, the second additional switches are actuated, which can also switch the comparatively large electrical current flow and the high electrical voltage without damage. As a result, the electric current commutates to the second drive unit, which is thus actuated.

For example, a second additional control unit can be assigned to the second additional switches, or the second additional switches are also controlled via the additional control unit. If the second additional control unit is available, it is energized in particular via the electrical voltage dropping across the second additional switches. Particularly preferably, a surge protector is connected in parallel to the second additional switch or switches, so that electrical overvoltage is avoided at the second additional switches. Alternatively, there is only one corresponding surge protector assigned to the additional switches and the second additional switches.

In an alternative to this, for example, only a varistor, an ohmic resistor, a fuse, a controllable resistance, a nonlinear resistor, the internal resistance of an electrical component, such as a current sensor, a shunt, an electrical coil, a diode, or a PTC thermistor, i.e., a PTC, is used as a resistor element. In another alternative, a MOSFET or IGBT is used as a resistor element, which also have an increased electrical resistance with increasing temperature. At least, however, the resistor element has one of the aforementioned components and comprises, for example, an interconnection of different, aforementioned components. Consequently, it is possible to use a large number of different components, including comparatively inexpensive ones. It is also possible to use an existing component as a resistor element that performs a different function. Thus, production costs are not increased. Also, without a corresponding control, an increasing electrical voltage already occurs across such components with an increasing electrical current conducted across the main current path, so that the commutation of the electric current to the second drive unit takes place. As a result, robustness is increased. However, essentially only the second drive unit is operated in the event of an electrical overcurrent.

For example, the circuit breaker can be formed only via the main current path with the resistor element, the mechanical switch, optionally the control unit and the drive. Particularly preferably, however, the circuit breaker comprises a fuse. For example, the fuse is connected in parallel to the mechanical switch, and this is designed in particular such that it trips when the mechanical switch malfunctions. In this way, security is increased. Particularly preferably, however, the fuse is connected in parallel to the mechanical switch. When the mechanical switch is closed, the electrical current flows through it, and there is essentially no electrical voltage at the fuse. When the mechanical switch is actuated, i.e., when it is opened, the electrical current commutates to the fuse, so that no arc is created between the moving contact and the fixed contact. Due to the (electrical) current flowing through the fuse, the fuse expediently trips so that the current flow through the fuse is interrupted. At this time, the moving contact is suitably distanced far enough from the fixed contact due to the drive so that no arc is created. As a result, the electrical current flow through the circuit breaker is terminated. In summary, a comparatively safe interruption of the electric current takes place, wherein the formation of an arc, through which the electric current is still conducted, is prevented.

For example, the fuse can be designed in such a way that via this, the electrical current occurring during normal operation can be carried, so that in this case the fuse does not trip. Preferably, however, the fuse is dimensioned such that it trips when the switch is opened under normal conditions, i.e., if there is no fault. In this way, the switching behavior of the circuit breaker is accelerated in the event of a fault. In addition, it is possible in this way to use a comparatively inexpensive fuse, which is designed only for a low rated current, and is designed in particular as a fast-acting fuse. In this case, the circuit breaker, i.e., the trigger, is actuated by actuating the drive, which can be set comparatively precisely. The fuse serves only to carry the electric current for a short time in order to prevent or at least shorten the formation of the arc in the mechanical switch. Thus, it is also possible to use fuses with a comparatively large fault tolerance, hence manufacturing costs are reduced. Due to the mechanical switch, it is possible to set the circuit breaker comparatively precisely, i.e., at which point it will trip.

Alternatively, or in combination thereto, a semiconductor switch is connected in parallel to the mechanical switch. In a further development, the semiconductor switch is connected in parallel to the series connection from the mechanical switch and the resistor element, i.e., also to the series connection from the second drive unit and the mechanical switch. In particular, a MOSFET, an IGBT, an IGCT or GTO is used as the semiconductor switch. The semiconductor switch is supplied, for example, via a separate power supply, for example via the control circuit. Alternatively, the semiconductor switch is supplied via the electrical voltage, which drops through the (opened/opening) mechanical switch or the second drive unit. In particular, the interconnection is such that when opening the mechanical switch and/or operating the second drive unit, the semiconductor switch is current carrying, so that no arc is formed in the mechanical switch. Also, for example, the possible power supply of the second drive unit is terminated. Consequently, the semiconductor switch also limits the maximum electrical voltage applied to the second drive unit, so that it is protected by this. After the mechanical switch is opened, the semiconductor switch in particular is also opened, so that the electrical current is interrupted.

In normal operation, the semiconductor switch is advantageously not current carrying, i.e., when the mechanical switch is closed, so that no electrical losses occur in the semiconductor switch, hence efficiency is improved. Preferably, a separate control unit is assigned to the semiconductor switch, or this is operated, for example, via the possible control unit, via which the drive, in particular the first drive unit, is also energized. Thus, the number of required components is reduced.

The circuit breaker can comprise a further semiconductor switch which is connected in series with the semiconductor switch, wherein the mechanical switch is bridged via the series connection. In this case, the two semiconductor switches are conveniently connected antiserially. Alternatively, the two semiconductor switches are connected antiparallel. As a result, the circuit breaker can be operated bidirectionally. For example, the two semiconductor switches are identical or different from each other. In another alternative, instead of the further semiconductor switch, a diode is electrically connected in series to the semiconductor switch. In a further development, the mechanical switch is bridged with an interconnection comprising the semiconductor switch which is electrically connected between two pairs of two diodes each, each of which is connected antiparallel to each other. In other words, a B4 bridge circuit is available, via which in particular a rectifier is realized. Via the diodes, it is ensured that the direction of the current flowing through the semiconductor switch is always the same, regardless of the direction of the current flowing through the main current path. Thus, the circuit breaker is bidirectional, wherein solely the only semiconductor switch is present.

Alternatively, or in combination thereto, a varistor can be conveniently connected in parallel to the semiconductor switch or switches or to the series connection, via which in particular an electrical overvoltage at the semiconductor switch or the interconnection, which could lead to damage, is avoided. In another alternative, the circuit breaker comprises a plurality of thyristors, which are interconnected antiparallel to each other, and via which the mechanical switch is bridged.

The mechanical switch can comprise an arcing chamber within which the contact bridge is conveniently arranged. For example, the arcing chamber comprises a plurality of extinguishing plates and/or a permanent magnet, via which any arc arising between the moving contact and the fixed contact is extinguished when the mechanical switch is actuated.

Preferably, in a stacking direction stacked on top of each other, the arcing chamber comprises arcing strips, i.e., several arcing strips, in particular at least two arcing strips and suitably less than 100 arcing strips. Preferably, the number of arcing strips is between 5 and 80, between 8 and 50 or between 10 and 30. Suitably, the number of arcing strips is less than or equal to 20. The arcing strips are designed flat and thus extend only to one plane each. Perpendicular to this plane, the extent of each arcing strip is reduced, and the extent, also known as thickness, is conveniently less than or equal to 2 mm, 1.5 mm or 1 mm. The arcing strips are conveniently arranged perpendicular to the stacking direction and parallel to each other. Preferably, the projections of the arcing strips parallel to the stacking direction overlap at least partially, preferably completely. Thus, a comparatively compact arcing chamber is provided.

The arcing strips can be made of a ceramic which is in particular electrically non-conductive and preferably thermally conductive. Particularly preferably, an oxide ceramic such as an aluminum-oxide ceramic (AlO3) is used as a ceramic. For example, the arcing chamber comprises a driving element for driving any arc arising during a switching operation of the mechanical switch to or between the arcing strips. In a further development, a choke or other electrical coil is electrically connected in parallel to the resistor element, via which in particular an electrical current increase is limited when the mechanical switch is opened. In a further development, the choke or the electric coil is electrically connected in series with any semiconductor switch, via which the series connection from the mechanical switch and the resistor element is bridged. Particularly preferably, the choke or electrical coil is used as a driving element via which the arc is moved. In other words, it is a blowout coil.

During operation, due to the formation of the arcing strips as an electrical insulator, the arc is not partially collected via the arcing strips, so that several partial arcs are formed. Rather, due to the electrically insulating properties of the arcing strips, the arc is deformed, in particular bent, so that one length of the arc is extended. Due to the increased length of the arc and the associated higher required electrical voltage, it is possible that the arc will go out. Thus, when extinguished, the arc has a length that can otherwise only be achieved with an enlarged arcing chamber.

In addition, the arcing strips can be used to cool the arc, namely the plasma required to form the arc. As a result, the electrical voltage required to maintain the arc also increases, and with sufficient cooling, the arc goes out. Due to the thermal conductivity of the arcing strips, an efficient removal of heat from the area of the arcing strips takes place in which the heat input from the arc into the respective arcing strip takes place. As a result, a cooling effect is further improved, so that even with a reduced size of the arcing chamber, the arc is safely extinguished. In addition, due to the separate arcing strips, even in the case of irregular heating of the latter, the resulting mechanical stress is limited to the individual arcing strips. Therefore, even with a comparatively large temperature difference between the individual arcing strips, no mechanical stress develops between them, which might lead to destruction. As a result, stability and operational reliability are increased.

The motor vehicle is, for example, land-bound and, for example, a passenger car. Particularly preferably, however, the motor vehicle is a commercial vehicle, such as a bus or particularly preferably a truck. The motor vehicle has a high-voltage electrical system, via which in particular a DC voltage between 400 V and 800 V is conducted. Furthermore, the motor vehicle comprises a low-voltage electrical system via which a DC voltage of 12 V, 24 V or 48 V is conveniently conducted. Here, the low-voltage electrical system serves in particular to supply power to auxiliary units of the motor vehicle, via which, for example, comfort functions or the like are provided. The high-voltage electrical system is used in particular to supply power to a main drive which conveniently comprises an electric motor. In this case, via the high-voltage electrical system, the main drive is preferably electrically connected to a high-voltage battery, via which the high-voltage electrical system is supplied. The low-voltage electrical system is powered, for example, via a transformer through the high-voltage electrical system or via a separate battery.

The motor vehicle comprises a circuit breaker with a mechanical switch inserted into a main current path, which has a fixed contact and a moving contact connected to a contact bridge movably mounted with respect to said fixed contact. The circuit breaker further comprises a drive which is in active connection with the contact bridge, and which comprises a first drive unit and a second drive unit. The first drive unit is energized via a control circuit, and the second drive unit is connected in parallel to a resistor element introduced into the main current path. As a result, it is possible for the second drive unit to be supplied with current via the main current path, namely when the electrical resistance of the resistor element is greater than the electrical resistance of the second drive unit.

The control circuit is electrically connected to the low-voltage electrical system and thus supplied via the low-voltage electrical system. The high-voltage electrical system has the main current path of the circuit breaker, which thus forms part of the high-voltage electrical system and is incorporated into it. Consequently, the mechanical switch and the first drive unit are located on different electrical potentials. When the circuit breaker is actuated, the high-voltage electrical system is disconnected so that electrical current flow is at least partially prevented via it.

Furthermore, the invention also relates to the use of such a circuit breaker for the protection of a high-voltage electrical system of a motor vehicle.

The further developments and advantages explained in connection with the circuit breaker are to be transferred mutatis mutandis to the motor vehicle and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
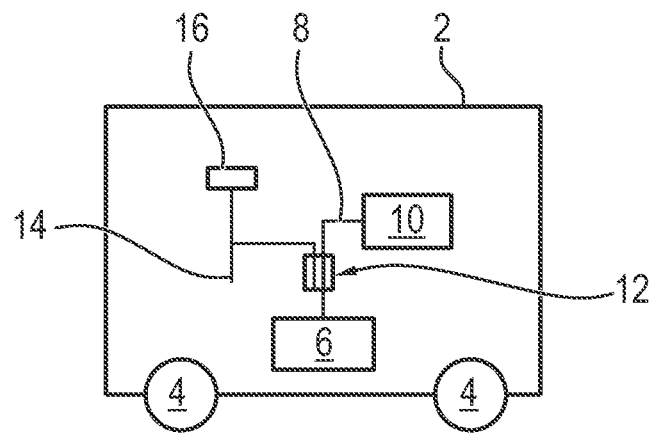
FIG. 1 shows, schematically, a motor vehicle with a circuit breaker.

FIG. 1 shows a schematically simplified motor vehicle 2 in the form of a truck. The motor vehicle 2 has a plurality of wheels 4, via which contact is made to an unspecified roadway. At least one of the wheels 4 is driven via a main drive 6, which comprises one or more electric motors. In other words, the motor vehicle 2 is designed either as a hybrid motor vehicle or as an electric motor vehicle.

The main drive 6 is connected via a high-voltage electrical system 8 to a high-voltage battery 10. Via the high-voltage battery 10, the high-voltage electrical system 8 is thus fed and the main drive 6 is operated. The high-voltage battery 10 provides an electrical DC voltage between 400 V and 800 V, wherein the electric currents flowing between the high-voltage battery 10 and the main drive 6 may be several 10 A. Furthermore, the high-voltage electrical system 8 is connected to an unspecified charging port, so that the high-voltage battery 10 can be charged via the charging port and the high-voltage electrical system 8.

In the high-voltage electrical system 8, a circuit breaker 12 is incorporated, via which the high-voltage electrical system 8 is protected. It is possible to prevent an electrical current flow between the high-voltage battery 10 and the main drive 6 via the circuit breaker 12. The circuit breaker 12 trips in the event of a fault, so that in the event of a fault, for example in the event of damage to the main drive 6, further damage or uncontrolled behavior of the main drive 6 and also a danger to occupants or pedestrians is avoided. Further, the circuit breaker 12 is signally connected to an unspecified on-board computer, via which safe functions are carried out with the involvement of the circuit breaker 12 or requests to perform safety functions are transmitted to the circuit breaker 12, which are subsequently carried out at least partially thereto by means thereof. Consequently, the circuit breaker 12 also serves to provide functional safety.

The circuit breaker 12 is also electrically connected to a low-voltage electrical system 14, which is fed by a battery 16. Via the battery 16, a DC voltage of 24 V is provided during operation, and with the low-voltage electrical system 14, unspecified auxiliary units are energized, which serve the operation of the main drive 6 and/or the provision of comfort functions.

Figure 2:
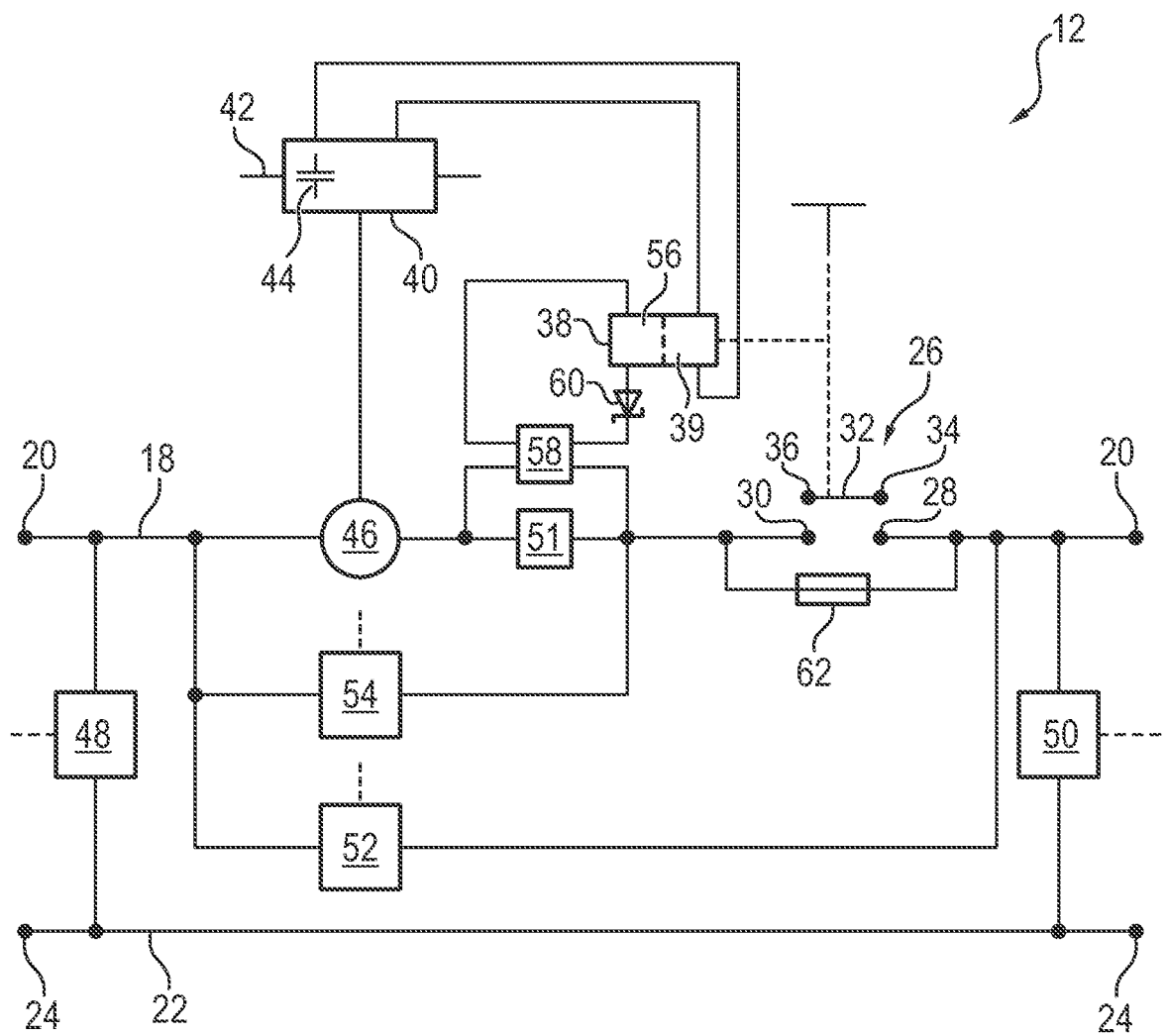
FIG. 2 shows a simplified circuit diagram of the circuit breaker, which comprises a "moving magnet actuator" with two drive units.

FIG. 2 shows a simplified switch diagram of the circuit breaker 12. The circuit breaker 12 has a main current path 18 extending between two connections 20. The two connections 20 are screw or plug connections and inserted into an unspecified housing of the circuit breaker 12, which is made of a plastic. The circuit breaker 12 further comprises a further main current path 22, which extends between two further connections 24, which are identical to the connections 20. The main current path 18 and the further main current path 22 form a part of the high-voltage electrical system 8, which thus has the main current path 18. For this purpose, the connections 20 and the further connections 24 are electrically contacted with corresponding cables or other wires of the high-voltage electrical system 8.

The further main current path 22 is created only via a busbar which is made of a metal, such as copper or brass. Via the further connections 24, the further main current path 22 is connected to ground, and in normal operation of the motor vehicle 2, the electric DC voltage provided via the high-voltage battery 10 is applied between the main current path 18 and the further main current path 22. In other words, the main current path 18 and the further main current path 22 are assigned to different poles of the high-voltage battery 10.

In the main current path 18, a mechanical switch 26 is introduced, via which the two connections 20 are connected, and which is designed as a double interrupter. For this purpose, the mechanical switch 26 comprises a fixed contact 28 and a further fixed contact 30, each of which is rigidly connected to one of the connections 20 via a rigid busbar and spaced from each other. The two fixed contacts 28, 30 are made of a material deviating from the material of the assigned busbars, which is in particular comparatively burn-proof.

The mechanical switch 26 further comprises a contact bridge 32 which is formed via a further busbar which is mounted to be longitudinally moving, i.e., movable, via an unspecified guide of the housing of the circuit breaker 12. At the opposite ends of the contact bridge 32, a moving contact 34 and a further moving contact 36 are connected, namely welded, wherein the material of the moving contacts 34, 36 corresponds to the material of the fixed contacts 28, 30.

By moving the contact bridge 32, it is possible to put the moving contact 34 in mechanically direct contact with the fixed contact 28 and the further moving contact 36 in mechanically direct contact with the further fixed contact 30, so that these are each electrically conductively connected. As a result, there is a low-impedance electrical connection between the two connections 20, and the mechanical switch 26 is electrically conductive. In other words, the mechanical switch 26 is closed. Furthermore, it is possible to distance the respective assigned contacts 28, 30, 34, 36 from each other by adjusting the contact bridge 32. In this case, the mechanical switch 26 is electrically non-conductive and thus open.

The contact bridge 32 is driven via a drive 38, so that when operating the drive 38, the contact bridge 32 is adjusted and thus the mechanical switch 26 is closed or opened. Consequently, the drive 38 is in active connection with the contact bridge 32, namely mechanically coupled to it. The drive 38 has a first drive unit 39, which is powered via a control unit 40. For this purpose, the control unit 40 is electrically connected to the drive 38, namely the first drive unit 39. For powering the control unit 40, and consequently the first drive unit 39, the control unit 40 is electrically contacted with a control circuit 42, via which a DC voltage is provided. The control circuit 42 is electrically directly contacted with the low-voltage electrical system 14, so that also via the control circuit 42, the DC voltage in the amount of 24 V is conducted. In summary, the first drive unit 39 is thus energized via the control circuit 42.

The control unit 40 comprises an energy storage 44 in the form of a capacitor, which is charged via the control circuit 42, and which is electrically connected in parallel to a microcontroller of the control unit 40. Thus, fluctuations in the electrical voltage and/or the electrical current of the low-voltage electrical system 14 are intercepted via the energy storage 44, so that damage to the microcontroller is thereby avoided. Also, it is possible due to the energy storage 44, in the event of a failure of the low-voltage electrical system 14, to actuate the drive at least once 38 and in this way open the switch 26.

In a more detailed variant, the control unit 40 also comprises a charge pump via which it is possible to increase the electrical voltage applied to the capacitor 44 as compared to the electric voltage provided via the low-voltage electrical system 14, so that the amount of energy stored via the energy storage 44 is increased. Thus, safe operation of the drive 38 is always possible, even if there is a complete failure of the low-voltage electrical system 14 or the drive 38 is slightly blocked.

Via the microcontroller, the current supply of the first drive unit 39 is adjusted, and this is signally connected to a current sensor 46 of the main current path 18. The current sensor 46 is inserted into the main current path 18 and designed as a shunt. Thus, via the current sensor 46, the electric current conducted via the main current path 18 can be measured. Furthermore, the circuit breaker 12 comprises a first voltage sensor 48, via which the electrical voltage applied between one of the connections 20 and one of the further connections 24 can be measured. Via a second voltage sensor 50, the electrical voltage applied between the remaining connection 20 and the remaining further connection 24 can be measured.

Via a third voltage sensor 52, the electrical voltage 51 decreasing through the series connection of the current sensor 46 and a resistor element 51 introduced between the current sensor 46 and the switch 26 in the main current path 18 is measurable, and via a fourth voltage sensor 54, the electrical voltage decreasing via the series connection from the current sensor 46, the resistor element 51 and the mechanical switch 26 is measurable. All voltage sensors 48, 50, 52, 54 are signally connected to the control unit 40, namely the microcontroller.

During operation, the temporal change of the electric voltages measured via the voltage sensors 48, 50 52, 54 and the electric current measured via the current sensor 46 is checked via the microcontroller of the control unit 40. If the temporal change of the measured current corresponds to an increase and exceeds a certain limit, the drive 38, namely the first drive unit 39, is controlled via the control unit 40, so that the switch 26 is opened. The limit value is chosen in such a way that it is only exceeded in the event of a fault, namely in the event of an electrical short circuit of the electric motor of the main drive 6. Due to the actuation of the mechanical switch 26, the electric current is interrupted and thus further destruction of the electric motor or other components of the main drive 6 is avoided. Likewise, the actuation of the mechanical switch 26 is carried out via the control unit 40, when the electrical voltage detected by the voltage sensors 48, 50, 52, 54 is used to conclude the fault, such as a malfunction of certain components of the motor vehicle 2.

Electrically parallel to the resistor element 51, which is electrically introduced between the further fixed contact 30 of the mechanical switch 26 and the current sensor 46 in the main current path 18, a second drive unit 56 of the drive 38 is connected. Here, the second drive unit 56 is electrically connected to the main current path 18 via a rectifier 58. Via the rectifier 58, which has an internal electrical resistance, it is ensured that the electric current carried by the second drive unit 56 flows only in a certain direction, regardless of the current flow direction of the main current path 18. Thus, the circuit breaker 12 is bidirectionally embodied, wherein the design of the second drive unit 56 is simplified. Between the rectifier 58 and the second drive unit 56, a Zener diode 60 is connected, wherein the blocking direction is arranged such that only starting from a minimum voltage provided via the rectifier 58 does the current supply of the second drive unit 56 occur.

The resistor element 51 is a PTC thermistor and has negligible ohmic resistance in normal operation. However, if the electric current conducted via the main current path 18 rises above a limit value, the temperature of the main current path 18 and thus also of the resistor element 51 increases due to electrical losses, hence the ohmic resistance of the resistor element 51 also increases. If the resistance is greater than the resistance of the parallel connected branch, which comprises the interconnection of the rectifier 58, the second drive train 56 and the Zener diode 60, the electric current commutates from the resistor element 51 to the parallel connected branch and thus also to the second drive unit 56, which is thus energized. As a result, a force is exerted via the second drive unit 56, which acts on the contact bridge 32, so that the moving contacts 34, 36 are distanced from the respective assigned fixed contacts 28, 30 and consequently the mechanical switch 26 is opened.

As a result, at a comparatively high electric current, the mechanical switch 26 is also opened via the second drive unit 56. In this case, it is possible to use both drive units 39, 56 to open the mechanical switch 26. In this case, a comparatively large force is applied to the contact bridge 32, hence the switching time is shortened and thus the mechanical switch 26 is opened in a comparatively short period of time. Consequently, the current flow between the two connections 20 is prevented within the comparatively short period of time. Furthermore, redundancy is given in this way, hence security is increased.

However, it is also possible to operate each of the drive units 39, 56 separately from each other. In this case, the force acting on the contact bridge 32 is reduced, so that the mechanical load is also reduced. It is also possible to energize the first drive unit 39 due to the control unit 40 in case of faults where, for example, no overcurrent occurs, or in which the electrical voltage dropping through the resistor element 51 is not sufficient for the electric current to commutate to the second drive unit 56.

If the mechanical switch 26 is opened, and the fault is present, there is a comparatively high electrical voltage between the connections 20 during the opening of the switch 26. As a result, an arc forms between the fixed contacts 28, 30 and the respective assigned and moving contact 34, 36 moving away, through which a current flow continues to take place. However, the electrical voltage dropping through the mechanical switch 26 increases. As a result, the electrical current commutates from the electrical switch 26 to a fuse 56 connected in parallel. Thus, the electrical current flows between the two connections 20 through the fuse 62, hence the arcs extinguish.

The fuse 62 is dimensioned in such a way that it trips in the event of a fault. The threshold at which the fuse 62 trips lies between the value of the electric current in normal operation and the value of the electric current resulting from a short circuit, wherein the exact value of the threshold in between can be chosen arbitrarily without changing the functioning of the circuit breaker 12. Thus, fault tolerances for the fuse 62 can be selected to be comparatively large, hence manufacturing costs are reduced. After tripping the fuse 62, no electric current is carried via this, and the two connections 20 are galvanically isolated from each other.

Figure 3:
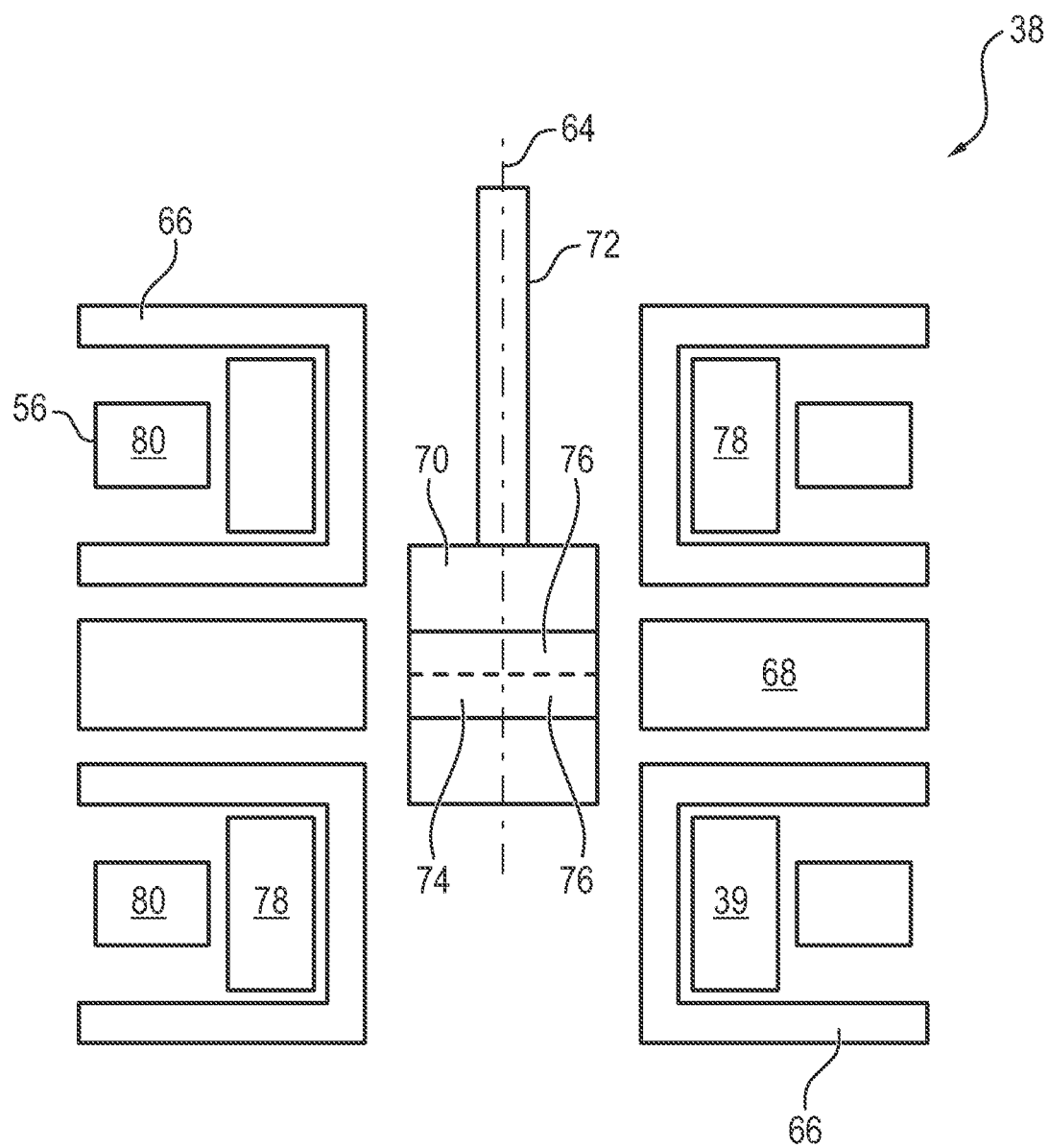
FIG. 3 shows schematically, the "moving magnet actuator" in a sectional representation.

FIG. 3 schematically shows the drive 38 in a sectional representation along an axis 64. The drive 38 is designed as a "moving magnet actuator" and thus comprises two disc coil or drum-like holders 66 arranged concentrically to the axis 64 and spaced along it, which are made of a ferromagnetic material. Between these, a ring-shaped short-circuit sheet 68 is positioned concentrically to the axis 64, which is also made of a ferromagnetic material. Via the holders 66 and the short-circuit sheet 68, a hollow cylinder is thus formed, within which another holder 70 is arranged from a plastic and is movably mounted via an unspecified guide along the axis 64. A rod 72 extending along the axis 64, which is attached to the contact bridge 32, either directly or via an unspecified mechanism, is attached to the holder 70. In the cylindrical further holder 70, a cylindrical permanent magnet 74 is embedded, which comprises two magnetic poles 76, each of which forms one of the ends of the permanent magnet 74 in a direction parallel to the axis 64.

The first drive unit 39 of the drive 38 comprises two electric coils 78. Each of the electric coils 78, which are identical to each other, is wound on one of the holders 66, and these are electrically connected in parallel to each other. The second drive unit 56 comprises two further electric coils 80, one of which is wound onto one of the electric coils 78 and the other on the remaining electric coils 78. The two other electric coils 80 are also electrically connected in parallel to each other. The number of turns of the further electric coils 80 is less than the number of turns of the electric coils 78.

If the two drive units 39, 56 are not energized, the permanent magnet 74 is pulled into a position substantially within the short-circuit sheet 68 due to the magnetic interaction with the short-circuit sheet 68 and the holders 66, wherein a force of about 30 N acts on the permanent magnet 70 and thus also on the further holder 70. With this force, the short-circuit bridge 32 is thus held in the desired position, namely in the one in which the mechanical switch 26 is closed.

In the event of a fault, the first drive unit 39 is energized via the control unit 40, so that a magnetic field is created via the electric coils 78, which interacts with the magnetic field of the permanent magnet 74. The second drive unit 56 and thus also the further electric coils 80 are also energized. Via this, the magnetic fields created by the electric coils 78 are amplified. Due to the magnetic fields created, the permanent magnet 74 is pushed away from one of the holders 66 along the axis 64 and pulled to the remaining holder 66. In this case, comparatively large forces act on the permanent magnet 74, and consequently through the further holder 70 and the rod 72 also on the contact bridge 32, so that the mechanical switch 26 is opened comparatively quickly.

If there is no fault case, and, for example, only the current supply of the main drive 6 is to be interrupted, for example for maintenance, the first drive unit 39 is energized via the control unit 40. Since there is no overcurrent, the electric current does not commutate from the resistor element 51 to the second drive unit 56, whose further electrical coils 80 are thus not energized. Consequently, a reduced force acts on the contact bridge 32, and the switch 26 is opened comparatively slowly. As a result, the electrical and also mechanical load of the circuit breaker 12 is reduced. Since in this case, the applied electrical voltage is limited between the connections 20, the fuse 62 does not trip, and the circuit breaker 12 can, for example, after completion of maintenance, be put back into the electrically conductive state. For this purpose, for example, the first drive unit 39 is energized in the opposite direction or the current supply is terminated, so that the permanent magnet 74 is again pulled to the short-circuit sheet 68.

Figure 4:
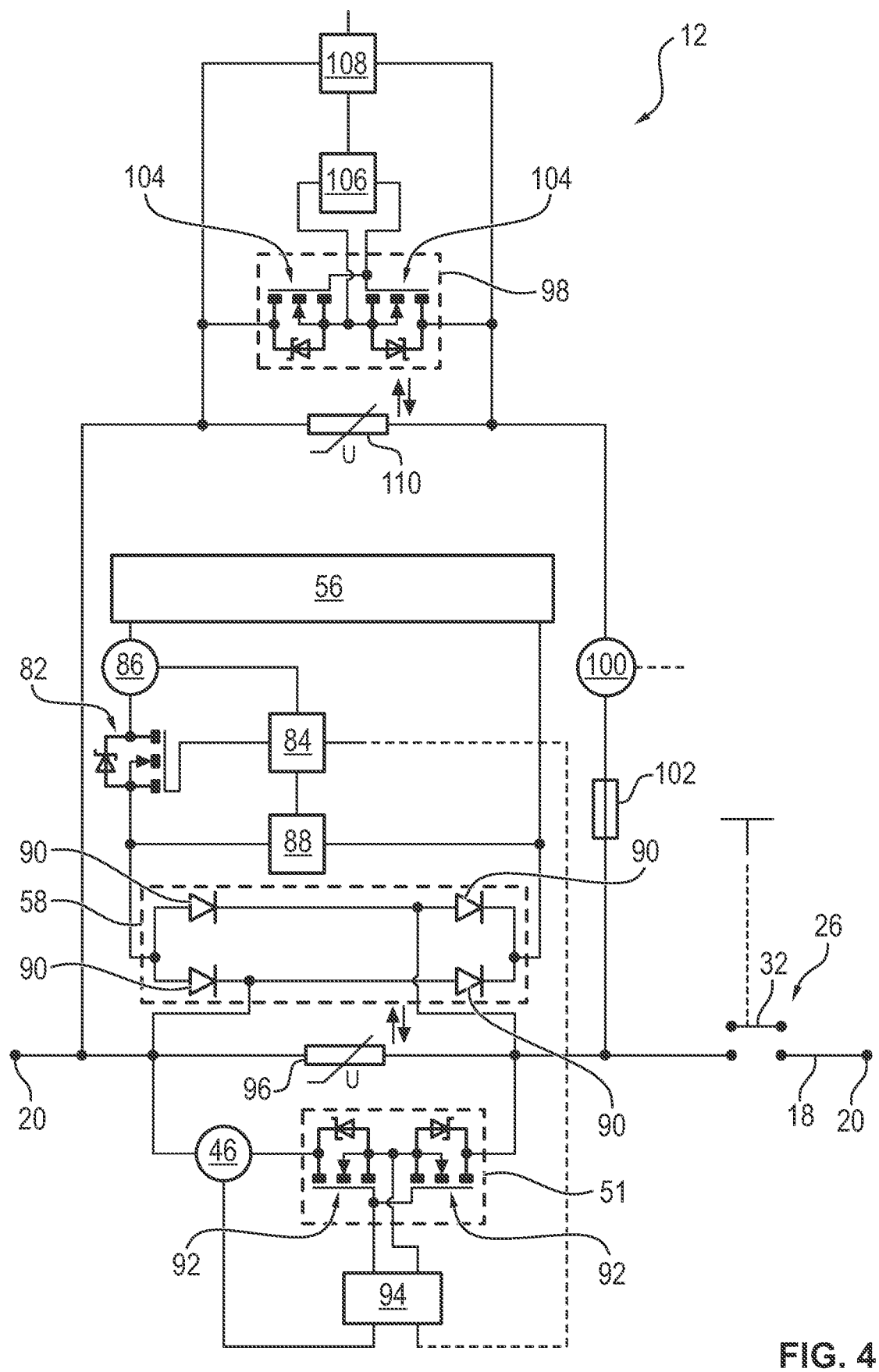
FIGS. 4-6 show, according to FIG. 2, in each case an example embodiment of the circuit breaker.

FIG. 4 shows an alternative embodiment of the circuit breaker 12 schematically simplified, wherein some components, such as the main current path 22 and the voltage sensors 48, 50, 52, 54, are not shown. However, these are also present, but can also, as in the previous embodiment, be omitted. The fuse 62 is omitted in this embodiment, but also present in an unspecified variant. The first drive unit 39 and the control unit 40 are not shown, but are not modified, just like the mechanical switch 26 shown.

In the variant shown herein, the rectifier 58 is electrically connected in parallel to the series connection from the current sensor 46 and the resistor element 51. However, the different arrangement of the current sensor 46 shown in FIG. 2 is also possible here.

The second drive unit 56 is not modified, but the Zener diode 60 is replaced by a second switch 82, which is controlled by a second control unit 84. The second switch 82 is a semiconductor switch, and electrically connected between the rectifier 58 and a second current sensor 86, which is electrically connected between the second switch 82 and the second drive unit 56. The second current sensor 86 is used to measure the electrical current conducted to the second drive unit 56 and carried by it and is signally connected to the second control unit 84.

The current of the second control unit 84 is supplied via a second power supply 88, which is electrically contacted with the outputs of the rectifier 58 facing the second drive unit 56. Consequently, the second power supply 88 and thus also the second control unit 84 is only energized if the electrical voltage dropping through the resistor element 51 is greater than that of the branch connected in parallel. The second switch 82 is closed by the second control unit 84 as soon as this is energized, so that the second drive unit 56 is energized and consequently the mechanical switch 26 is opened. However, if the overcurrent is comparatively large and could lead to the destruction of the second drive unit 56, the second switch 82 is opened via the second control unit 84 and thus the current supply of the second drive unit 56 is terminated. The determination of the excessive overcurrent is carried out on the basis of the electric current measured via the second current sensor 56. In addition, it is possible via the second switch 82 to apply a pulse width modulated voltage to the second drive unit 56, so that the force exerted by the second drive unit 56 on the contact bridge 32 is limited.

The rectifier 58 has a total of 4 diodes 90, and is thus passively designed. Thus, no control unit or the like is required for the operation of the rectifier 58, so that robustness is increased. The resistor element 51 is formed via two additional switches 92, each of which is semiconductor switches which are interconnected antiserially. The additional switches 92 are controlled via an additional control unit 94, which is powered via the control circuit 42.

The additional control unit 94 is signally connected to the current sensor 46. If the overcurrent is measured via the current sensor 46, this is evaluated via the additional control unit 94, and the additional switches 92 are controlled in such a way that they open, i.e., electrically lock. Due to the anti-serial interconnection of the two additional switches 92, it is possible to interrupt the current flow in both directions via the main current path 18.

After opening the further switches 92, the resistor element 51 substantially abruptly has a comparatively high electrical resistance, and the electric current commutates to the second drive unit 56. In order to avoid an overvoltage at the rectifier 58 and the resistor element 51, a surge protector 96 is connected in parallel, which is a varistor in this variant. In an unspecified variant, the surge protector 96 is realized via Zener diodes, TVS diodes, an RCD circuit, a controllable resistive load or a combination thereof.

The additional control unit 94 is, as shown, signally connected to the second control unit 84, and via the additional control unit 94, the second control unit 84 is controlled such that the second switch 82 is closed when the additional switches 92 are opened. In an unspecified variant, the second control unit 84 is not present, and its functions are taken over via the additional control unit 94, via which thus the second switch 82 is controlled and the second current sensor 86 is read out. In a further variant, the signaling connection between the additional control unit 94 and the second control unit 84 is not present, and these are separate and independent of each other.

In the variant shown herein, a series connection formed of a second resistor element 98, an additional current sensor 100 and an additional fuse 102 is connected in parallel to the series connection from the current sensor 46 and the resistor element 51. However, an embodiment of the circuit breaker 12 without these series connections and consequently without the second resistor element 98 is possible.

The second resistor element 98 is formed via two additional switches 104, each of which is designed as semiconductor switches. In this case, the two semiconductor switches 104 are connected antiserially to each other, so that an electrical current flow in both directions can be interrupted via this. The two additional switches 104 are operated via a second additional control unit 106, which is powered by a second additional power supply 108. The second additional power supply 108 is operated by the electrical voltage dropping through the second resistor element 98. Parallel to the second resistor element 98, a second surge protector 110 is connected, which is also a varistor in the variant shown. However, all variants possible for surge protector 96 can also be used here. In an embodiment not specified in more detail, the operation of the second surge protector 110, namely the limitation of the electrical voltage applied to the second resistor element 98, is also perceived via the surge protector 96.

In the illustrated variant of the circuit breaker 12, the additional switches 92 have a comparatively low internal resistance, so that in normal operation via these, the electric current conducted via the main current path 18 is conducted. In this case, the electrical voltage dropping through the second resistor element 98 is comparatively low, hence the second additional power supply 108, and therefore also not the additional control unit 106, is operated. As a result, the second additional switches 104 are open. If the fault occurs, the additional switches 92 are first actuated via the additional control unit 94. The resulting increased electrical voltage dropping at the second resistor element 98 leads to the operation of the second additional power supply 108 and therefore also to the current supply of the additional control unit 106, via which the second additional switches 104 are closed. Thus, the electric current commutates to the second resistor element 98, i.e., the second additional switches 104. As a result, the maximum electrical voltage applied to the resistor element 51 is limited, and via the additional switches 92 only a comparatively low electrical voltage is switched, so that semiconductors can be used comparatively inexpensively for the additional switches 92.

Only after the additional switches 92 are current blocking are the second additional switches 104 opened, whose switching capability is increased as compared to that of the additional switches 92. In other words, switching an increased electrical voltage via the second additional switches 104 is possible without destroying these. Subsequently, the electric current flows via the second drive unit 56 and optionally via the surge protectors 96, 110, and subsequently the mechanical switch 26 is opened.

As long as the second additional switches 104 are current carrying, the electrical current carried therewith is measured via the additional current sensor 100. If the electric current exceeds a corresponding limit that could lead to the destruction of the second additional switches 104, they are opened via the additional control unit 106 and thus the current flow is interrupted. The additional fuse 102 serves as redundancy for this, in particular in case of malfunction of the additional control unit 106.

Figure 5:
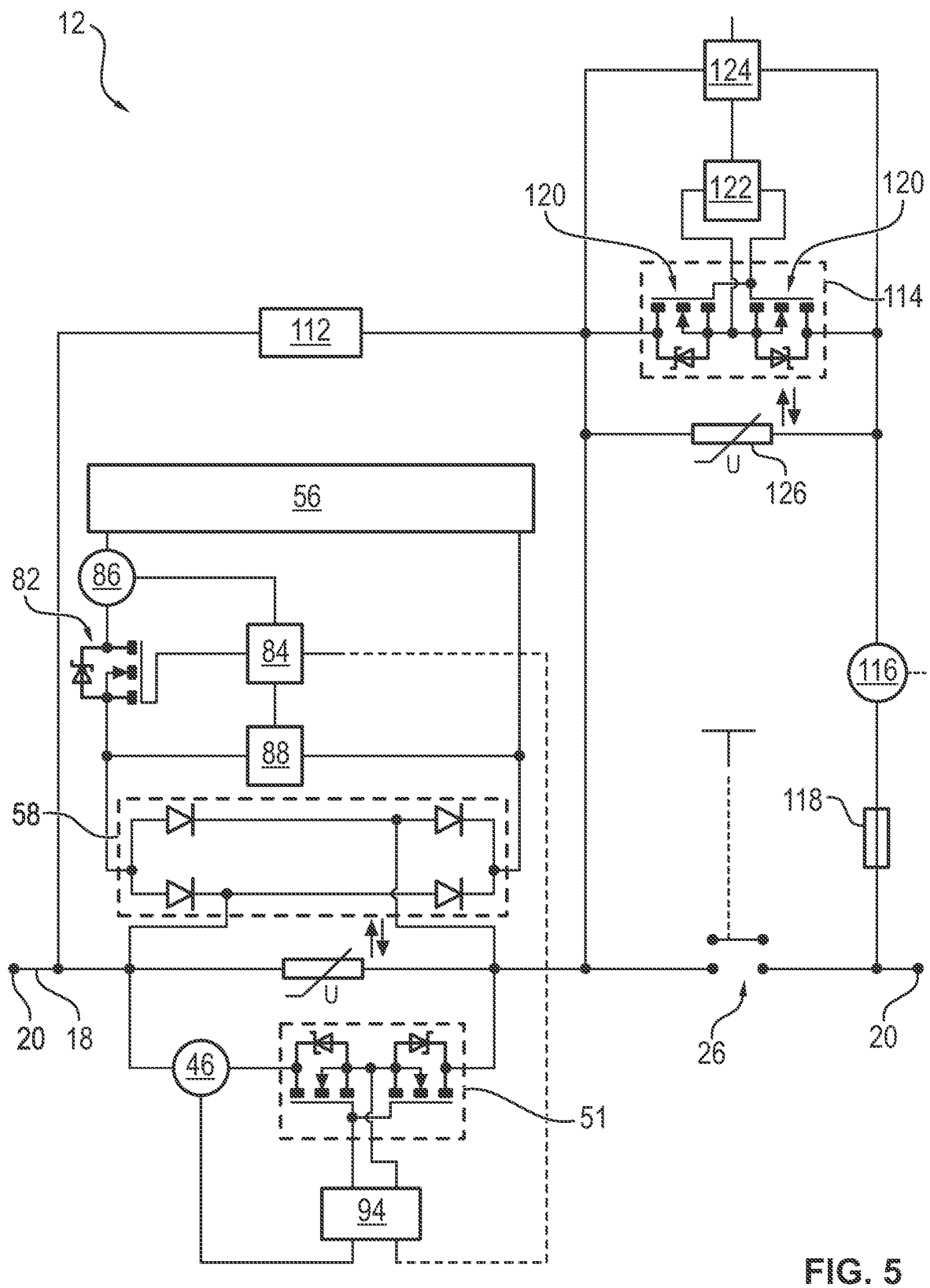

FIG. 5 shows a further variant of the circuit breaker 12, wherein as compared to the preceding embodiment, the series connection having the second resistor element 98, the additional current sensor 100 and the additional fuse 102 is replaced by a choke 112. Via this, the temporal change of the electric current conducted via the second drive unit 56, the surge protector 96 and/or the resistor element 51 is limited when the mechanical switch 26 is actuated, i.e., the current flow through the main current path 18 is created or terminated. Thus, a load on these components is reduced. It is thus possible to use comparatively cost-effective components. However, the general mode of operation of the second drive unit 56, the rectifier 58, the resistor element 51 and the additional control unit 94 and the second control unit 84 and their corresponding circuits are not changed.

The mechanical switch 26 is bridged in this variant via a series connection from a switch group 114, a third current sensor 116 and a third fuse 118. The switch group 114 comprises two semiconductor switches 120 antiserially connected to each other. Consequently, the two semiconductor switches 120 are connected in parallel to the mechanical switch 26. The two semiconductor switches 120 are operated via a further control unit 122 and set via this either to the electrically conductive or electrically non-conductive state. The current supply of the further control unit 122 is carried out via a further power supply 124, which is supplied either via an electrical voltage dropping through the mechanical switch 26 or via the control circuit 42.

Parallel to the switch group 114, a further surge protector 126 is connected, which is a varistor in the variant shown. In an unspecified variant, the further surge protector 126 is realized via Zener diodes, TVS diodes, an RCD circuit, a controllable resistive load or a combination thereof. Via the further surge protector 126, an electrical overvoltage at the switch group 114 and the further control unit 122 and further power supply 124 is avoided, which could otherwise lead to destruction thereof.

In summary, the structure of the further surge protector 126, the switch group 114, the further control unit 122, the further power supply 124, the third current sensor 116 and the third fuse 118 corresponds to the structure of the second surge protector 110, the second resistor element 98, the second additional control unit 106, the second additional power supply 108, the additional current sensor 102 and the additional fuse 102.

In this embodiment of the circuit breaker 12, the semiconductor switches 120 are electrically non-conductive as long as the mechanical switch 26 is closed. When the switch 26 is opened, the electrical voltage applied through the switch group 114 increases, so that the further power supply 124 is operated and therefore the further control unit 122 is energized. Via the further control unit 122, the switch group 114, namely the individual semiconductor switches 120, is controlled, so that these are current conducting. As a result, the electric current commutates and is guided via the switch group 114. Therefore, the arcs formed between the fixed contacts 28, 30 and the respective moving contacts 34, 36 extinguish. Subsequently, the semiconductor switches 120 are electrically controlled in such a way that they block electrical current, so that the electrical current flow between the two connections 20 is terminated.

Via the further surge protector 126 it is ensured until then that no overload of the semiconductor switches 120 occurs. If it is detected via the further current sensor 116, which is signally connected to the further control unit 122, that a comparatively large electric current is conducted with the switch group 114, which could lead to damage to the semiconductor switches 120, the semiconductor switches 120 are also opened and thus damage to the switch group 114 is avoided. Via the further fuse 118 it is ensured that even in the event of a malfunction of the further control unit 122 and a comparatively high electric current, the current flow via the switch group 114 is interrupted.

In this variant of the circuit breaker 12, there is a plurality of different sequences of control of the individual components so that the circuit breaker 12 is opened. Thus, it is possible that first the switch group 114 is current carrying and then the mechanical switch 26 is opened. Subsequently, the switch group 114 is converted to the electrically non-conductive state. In this way, a low-arc switching is carried out via the circuit breaker 12. However, it is also possible to first actuate the mechanical switch 26 so that the further control unit 122 is energized based on the electrical voltage generated by the mechanical switch 26. Subsequently, the switch group 114 is set to the electrically conductive state, so that the arcs extinguish. Subsequently, the switch group 114 is also converted to the electrically non-conductive state. In a further type of control, the switch group 114 is first set to the electrically conductive state and then the resistor element 51 to the electrically non-conductive state. Consequently, the mechanical switch 26 is opened. Subsequently, the switch group 114 is put into the electrically non-conductive state, wherein during this time or until then, the current rise is limited via the choke 112.

In an unspecified further development, the circuit breaker 12 is constructed according to FIG. 5. However, the bridging of the mechanical switch 26 is omitted. In other words, the switch group 114, the further control unit 122, the further power supply 124, the further surge protector 126 and the third current sensor 116 and the third fuse 118 are not present.

Figure 6:
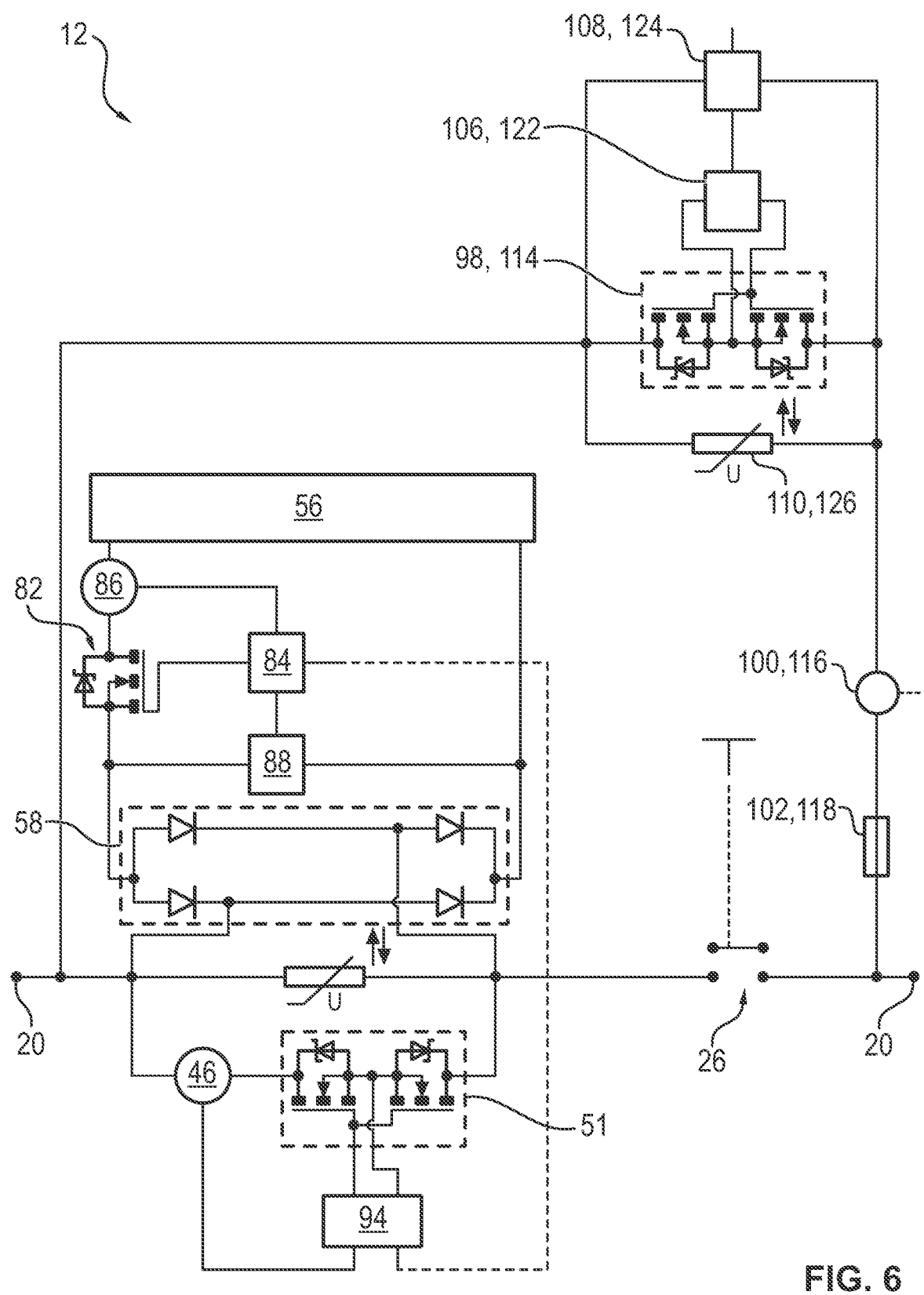

FIG. 6 shows a further embodiment of the circuit breaker 12. Compared to the preceding embodiment, not only the mechanical switch 26, but the series connection having the mechanical switch 26 and the resistor element 51 and the current sensor 46 is bridged via the series connection from the switch group 114, the third current sensor 116 and the third fuse 118. In addition, the choke 112 is omitted, although it may also be present here. Compared to the variant shown in FIG. 4, the additional fuse 102 is guided on the opposite side of the mechanical switch 28 against the main current path 18, so that the series connection of the second resistor element 98, the additional current sensor 100 and the additional fuse 102 bridges the series connection having the current sensor 46, the resistor element 51 and the mechanical switch 26. With this variant it is also possible that the choke 112 is present.

In the case of an overcurrent, the resistor element 51 is controlled via the additional control unit 94, so that it is no longer current bearing. As a result, the electric current commutates to the second drive unit 56, which has an electrical resistance. Therefore, the electrical voltage dropping through the second resistor element 98 or the switch group 114 increases, so that the second additional power supply 108 or the further power supply 124 are operated. Via the now energized second additional control unit 106 or further control unit 122, the second resistor element 98 or the switch group 114 is put into the electrically conductive state.

Due to the continuous current supply of the second drive unit 56, the mechanical switch 26 is opened. As a result, the electric current between the connections 20 is subsequently conducted only via the second resistor element 98 or the switch group 114. Via any existing choke 112, the current increase through this branch is limited, so that overloading is avoided. Subsequently, via the second additional control unit 106 or the further control unit 122, the second resistor element 98 or the switch group 114 is set to the electrically non-conductive state, so that the electrical current flow between the two connections 20 is terminated. In this variant, there is no formation of an arc via the mechanical switch 26.

Figure 7:
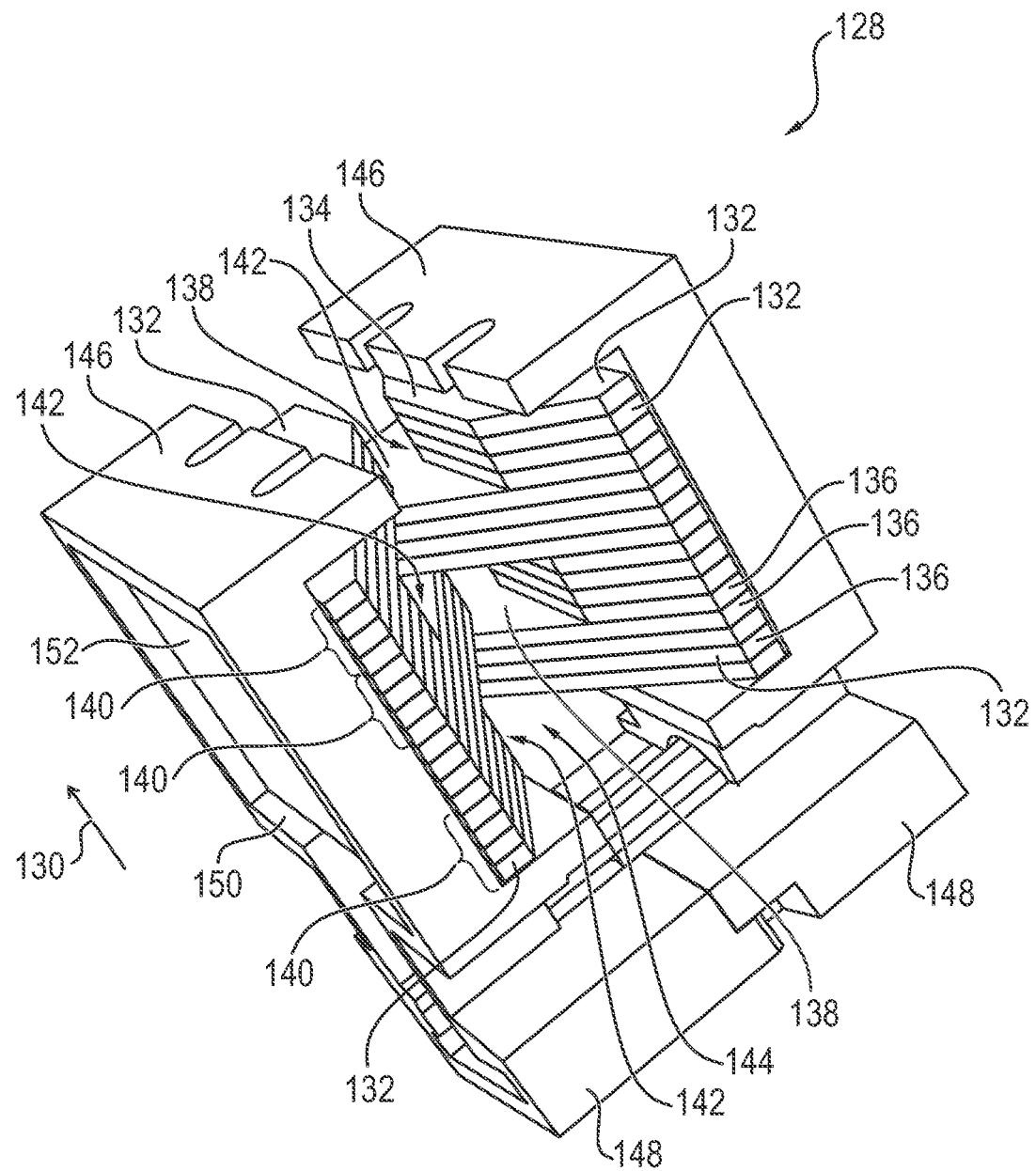
FIG. 7 shows, in perspective, an arcing chamber of the mechanical switch.

FIG. 7 shows an arcing chamber 128 of the mechanical switch 26 in perspective. The arcing chamber 128 is used here to extinguish an arc arising during a switching operation of the mechanical switch 26 unless the other existing components are used for this purpose. The arcing chamber 128 comprises a plurality of arcing strips 132 stacked on top of each other in a stacking direction 130. The arcing strips 132 are made of an aluminum-oxide ceramic and designed flat and arranged perpendicular to the stacking direction 130. The thickness of the arcing strips 132, i.e., their expansion in the stacking direction 130, is between 1 mm and 2 mm. The arcing strips 132 lie directly next to each other, so that a stack 134 is formed. The stack 134 has a plurality of layers 136 arranged on top of each other in the stacking direction 130, which are thus arranged perpendicular to the stacking direction 130.

Each of the layers 136 are assigned two of the arcing strips 132. The two arcing strips 132 of each layer 136 are different from each other, and one of the arcing strips 132 is wedge-shaped and the remaining one trapezoidal. In other words, the arcing strips 132 assigned to each of the layers 136 differ, but each layer 136 is assigned the same arcing strips 132, i.e., the same type. In other words, the arcing chamber 128 has two different types of arcing strips 132, namely the wedge-shaped and the trapezoidal, and these are evenly divided among the layers 136.

The two arcing strips 132 of each layer 136 are spaced to each other perpendicular to the stacking direction 130, so that between them a slot 138 is formed. Four of the layers 136 are each combined into a group 140, wherein the arcing strips 132 of each group 140 are arranged flush with each other. The arcing strips 132 of the respective adjacent group 140, on the other hand, are arranged mirror-inverted, so that the stack 134 has a plurality of superimposed chambers 142 that are separated from each other in the stacking direction 130, each of which is formed via the aligning slots 138. Due to the wedge or trapezoidal shape, a notch 144 is formed in each of the layers 136, which merge into the respective chambers 142. There are a total of four such groups 140.

The stack 134 is enclosed on both sides via a holder 146 and thus stabilized. The holders 146 are mirror image to each other and made of a plastic and each have a foot 148. The two holders 146 are attached to each other at the respective foot 148, so that the stack 134 is held by a force fit between the two holders 146 both in the stacking direction 130 and perpendicular to it. On the side opposite the stack 134, each of the holders 146 has a rectangular pot or pan-shaped receptacle 150, within which a permanent magnet 152 is inserted in the assembly state, each of which forms a driving element.

The arcing chamber 128 is oriented with respect to the fixed contact 28, 30 and the moving contact 34, 36 such that an arc arising when actuating the mechanical switch 26, i.e., when the drive 38 is actuated, meets the stack 134 in the region of the notches 144. Due to the interaction between the magnetic field of the permanent magnets 152 and the magnetic field created by the arc, this is driven further into the stack 134, namely into the individual chambers 142. Thus, embedded sections of the arc are formed in the respective chambers 142, which are designed in a U-shape. The subsections are connected to each other, wherein the connecting sections enclose the stack 134 on the side of the notches 144. Consequently, the arc is comparatively long. Due to the notches 144, the arc is not able to bypass the arcing chamber 128. Because of the increase in the length of the arc, the electrical voltage required to maintain it increases.

Furthermore, there is heat input from the plasma forming the arc into the individual arcing strips 132, so that the arc is cooled. Due to the ceramic used, the heat is dissipated comparatively effectively and the arc is thus cooled. Because of the cooling, the electrical voltage required to maintain the arc also increases. Since the individual arcing strips 132 are separate from each other, no excessive mechanical stress forms in the stack 134 even with uneven heating of the individual arcing strips 132, which could lead to destruction.

If the choke 112 is present, as for example in the embodiment shown in FIG. 5 and in the unspecified modification described therein or in the not-shown further development of the further embodiment of FIG. 6, this is also used in a further development to drive the arc into the chambers 142. Here, the choke 112 is positioned accordingly and thus acts as a so-called blowout coil. Thus, it is possible that the permanent magnets 152 are omitted, or these are available as additional support. The choke 112 is live only when the mechanical switch 26 is actuated. Thus, the magnetic field for driving the arc into the chambers 142 is generated only if the arc is actually present or at least could arise.

The invention is not limited to the embodiments described above. Rather, other variants of the invention can be derived from it by the skilled person without leaving the subject-matter of the invention. In particular, all the individual features described in connection with the individual embodiments can also be combined in other ways without departing from the subject-matter of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A circuit breaker comprising:
   a mechanical switch provided in a main current path, the mechanical switch having a fixed contact and a moving contact, the moving contact being connected to a movably mounted contact bridge; and
   a drive, which is in active connection with the contact bridge, the drive having a first drive unit and a second drive unit,
   wherein the first drive unit is energized via a control circuit,
   wherein the second drive unit is connected in parallel to a resistor element provided in the main current path, and
   wherein between the second drive unit and the main current path, a Zener diode and/or a second switch is connected.

2. The circuit breaker according to claim 1, wherein the second drive unit is connected via a rectifier to the main current path.

3. The circuit breaker according to claim 1, further comprising a control unit fed from the control circuit, via which the first drive unit is energized.

4. The circuit breaker according to claim 1, wherein the drive comprises a moving magnet actuator via which the two drive units are formed.

5. A circuit breaker comprising:
   a mechanical switch provided in a main current path, the mechanical switch having a fixed contact and a moving contact, the moving contact being connected to a movably mounted contact bridge; and
   a drive, which is in active connection with the contact bridge, the drive having a first drive unit and a second drive unit,
   wherein the first drive unit is energized via a control circuit,
   wherein the second drive unit is connected in parallel to a resistor element provided in the main current path, and
   wherein the resistor element comprises an additional switch, which is controlled via an additional control unit.

6. The circuit breaker according to claim 1, wherein, a fuse is connected in parallel to the mechanical switch.

7. The circuit breaker according to claim 1, wherein a semiconductor switch is connected in parallel to the mechanical switch or to the series connection from the mechanical switch and the resistor element.

8. A circuit breaker comprising:
   a mechanical switch provided in a main current path, the mechanical switch having a fixed contact and a moving contact, the moving contact being connected to a movably mounted contact bridge; and
   a drive, which is in active connection with the contact bridge, the drive having a first drive unit and a second drive unit,
   wherein the first drive unit is energized via a control circuit,
   wherein the second drive unit is connected in parallel to a resistor element provided in the main current path, and
   wherein the mechanical switch comprises an arcing chamber, the arcing chamber comprising a plurality of flat arcing strips arranged in parallel to each other and stacked on top of each other in a stacking direction, wherein the arcing strips are made of a ceramic.

9. A motor vehicle comprising:
   a high-voltage electrical system,
   a low-voltage electrical system, and
   a circuit breaker according to claim 1,
   wherein the control circuit of the circuit breaker is electrically connected to the low-voltage electrical system, and
   wherein the high-voltage electrical system has the main current path.

* * * * *